United States Patent Office
3,224,652
Patented Dec. 21, 1965

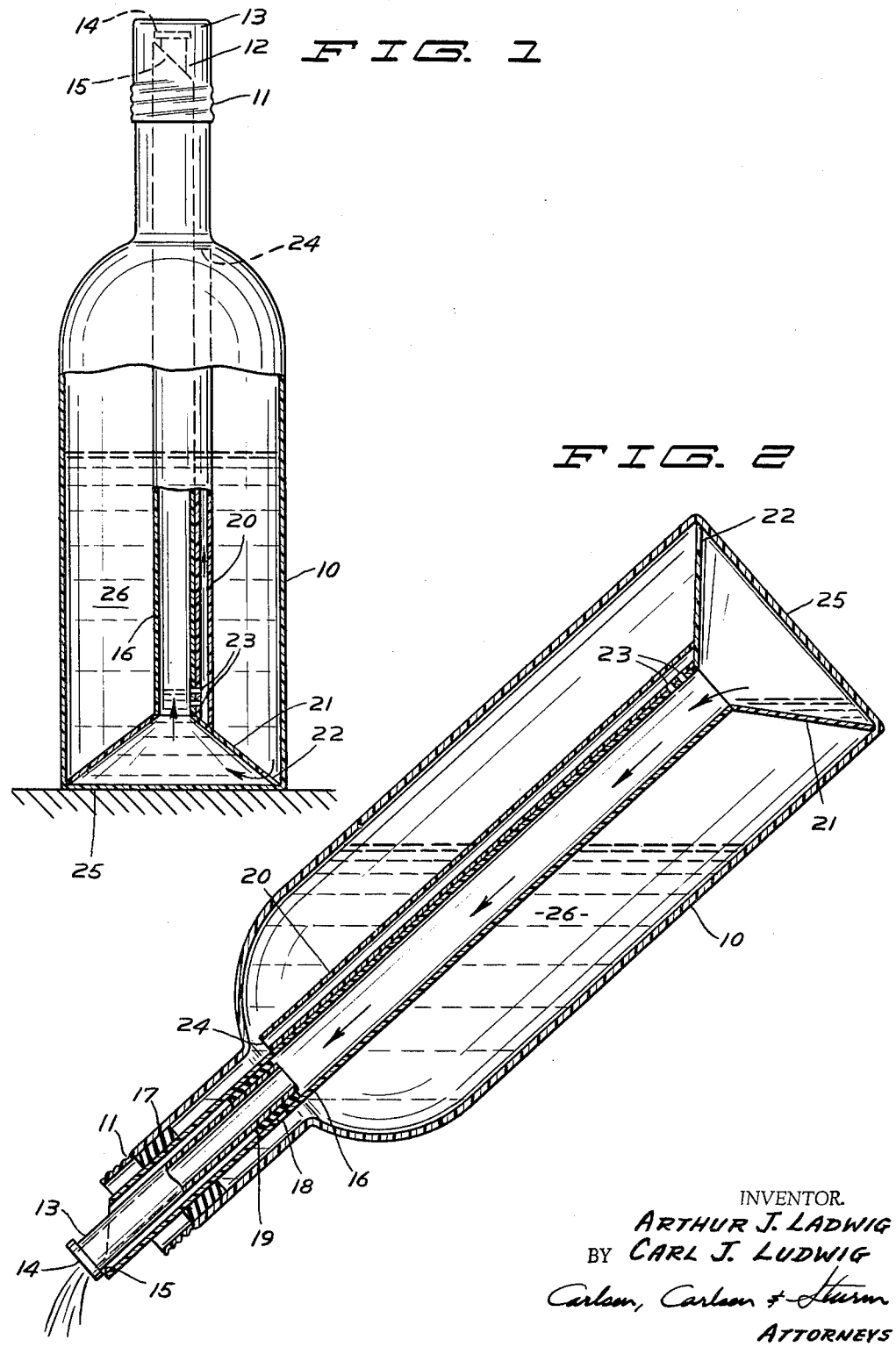

3,224,652
METERING LIQUID DISPENSER
Arthur J. Ladwig, 1125 NE. 4th St., and Carl J. Ludwig,
4730 Yates Ave. N., both of Minneapolis, Minn.
Filed May 27, 1964, Ser. No. 370,632
6 Claims. (Cl. 222—442)

This invention relates generally to fluid dispensers and is more particularly directed to fluid dispensers of the class in which predetermined amounts of fluid are dispensed from a container which includes an internally disposed measuring and dispensing means.

The prior art with which our invention is concerned is replete with various means, apparatus and mechanisms for dispensing predetermined amounts of fluid from bottles and other containers. It has been observed that the prior art devices known to us fall into two classes. The first class is concerned with devices which do not accurately measure the fluid to be dispensed. The second class is concerned with devices which may provide an accurate measurement of fluid to be dispensed but are difficult and expensive to manufacture.

As will become apparent from a consideration of the description set forth below, we have provided an improved dispensing apparatus to be utilized in combination with a container for a fluid, or liquid to be dispensed, which is accurate and easily and inexpensively manufactured. Preferably, our apparatus is adapted to be formed integrally with a container, and the entire assembly is intended to be disposable after the contents have been used.

Briefly our invention comprises a container which has a combined dispensing and measuring means disposed therein. The measuring and dispensing means is comprised of a measuring chamber disposed in proximity to and adjacent to the bottom of the container and in fluid communication with the interior of the container. A suitable dispensing conduit, or tube, extends upwardly through the top of the container from the measuring chamber. A suitable venting means extends intermediate the top interior portion of the container and a predetermined position in proximity to the top of the measuring chamber, and fluid communication is provided with the chamber whereby fluid in the container will rise to this point in the measuring and dispensing means and the container may be inverted to dispense a predetermined amount of fluid as determined by the size of the measuring chamber.

It is therefore an object of our invention to provide improved fluid dispensing apparatus.

A further object of our invention is to provide improved fluid dispensing apparatus which may be easily and inexpensively manufactured.

A further object of our invention is to provide an improved fluid dispensing apparatus which may be discarded after the contents have been emptied.

A still further object of our invention is to provide an improved fluid dispensing apparatus which accurately dispenses predetermined amounts of fluid from a container.

These and other objects of our invention will become apparent from a consideration of the appended specification, claims and drawing, in which:

FIG. 1 is a side elevational sectional view of a dispensing container embodying the principles of our invention shown in an upright position; and FIG. 2 is a further drawing of the apparatus shown in FIG. 1 in an inverted, dispensing position.

Referring now to the drawing in which like elements have been identified by like reference characters, a container 10, shown in the form of a bottle having a bottom 25 and a screw threaded neck 11 at its upper end, is illustrated as having a dispensing and measuring means comprised of a measuring chamber 21 disposed adjacent bottom 25 of container 10 and a dispensing portion 16 extending upwardly from the top of chamber 21 through the top of container 10. Dispensing portion, or tube 16, is shown sealed around its upper outer periphery by sealing means 17 in proximity to the top of container 10. Sealing means 17 may be any suitable material that provides an airtight seal.

A venting means, shown in the form of tube 20, extends intermediate the top of measuring chamber 21 and upwardly into proximity with the top interior of container 10 whereat the upper opening 24 is disposed above the level of any fluid or liquid in the container 10. The lower end of tube 20 is connected to the interior of measuring chamber 21 through suitable openings indicated by reference character 23. Container 10 is shown filled with a liquid 26 to the level indicated therein.

Dispensing tube 16 is shown provided with a sloping top 15 which is adapted to dispense liquid from the upper left end which is disposed opposite to an access opening 22 provided in measuring chamber 21 in proximity to and adjacent the bottom 25 of container 10. Tube 16 is also provided with an opening 18 in proximity to the top interior portion of container 10 and a further tube 13 having an open top 14 is slidably and sealingly disposed through sealing means 19, in tube 16 and is operative between positions of opening and closing opening 18 for purposes to be described below. A suitable cover 12 is shown disposed on the screw threads 11 at the top of container 10.

While our invention has been illustrated in connection with a conventional bottle as a container for fluid, it will be apparent to those skilled in the art upon becoming familiar with the principles of our invention that various other shapes and forms of containers may be successfully utilized in applying the principles of our invention.

It is anticipated that suitable containers and measuring and dispensing apparatus may be formed of plastic materials which are not susceptible to the breakage which ordinarily occurs when using, for example, glass containers and may be easily disposed of when the contents have been emptied. Suitable plastic materials which are combustible may be utilized so that disposition of the dispenser-containers may conveniently be made when the contents have been emptied.

The operation of our invention may be understood from a consideration of FIGS. 1 and 2 of the drawing. In FIG. 1, the liquid in the bottle has entered measuring chamber 21 and is shown as having reached the level determined by the top opening 23 extending intermediate the measuring and dispensing portion of the apparatus and venting means 20. By removing cover 12 and inverting container 10 to the position shown in FIG. 2, the predetermined amount of liquid in chamber 21 and tube 16 will flow through tube 16 into an appropriate container. When container 10 is again placed in an upright position, fluid will enter chamber 21 through opening 22 and will again rise to the level indicated on FIG. 1 and the container will be ready to dispense another predetermined quantity of fluid.

Should it be desirable, for any reason, to empty the entire contents of the container in amounts other than are determined by the operation described above, tube 13 may be extended upwardly to uncover opening 18 on tube 16 to allow the entire contents of the container to be removed.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A fluid dispenser comprising in combination:
   (a) a container;
   (b) a chamber of predetermined size disposed adjacent the bottom of said container, said chamber including an opening at its top and an access opening disposed adjacent the bottom of said container;

(c) a first tube extending upwardly from the opening through the top of said container, said first tube having a vent opening in proximity to the top end thereof and adapted to lie inside of said container;

(d) a second tube extending upwardly from the top of said chamber;

(e) a third tube slidably disposed in the top end of said first tube and operable to open the vent opening in said first tube upon upward extension thereof; and (f) means providing fluid communication intermediate the lower end of said second tube and the top of said chamber whereby fluid in said container will enter said chamber through the access opening in the bottom thereof and will rise to a level determined by the means providing fluid communication intermediate the lower end of said second tube and the top of said chamber.

2. The apparatus of claim 1 in which the chamber of predetermined size is comprised of an inverted cone.

3. The apparatus of claim 1 in which the top end of the first tube is shaped to dispense liquid from the opposite side of the container with respect to the access opening in the chamber of predetermined size.

4. A dispenser for dispensing predetermined amounts of fluid from a container when the container is placed in a substantially inverted position comprising in combination:

(a) a longitudinally elongated closed container;

(b) a fluid dispensing and measuring member comprised of a measuring chamber in fluid communication with and disposed adjacent the bottom of said container and a dispensing tube extending upwardly through the top of said container, said dispensing tube including a vent opening adapted to be disposed in proximity to and within the top of said container;

(c) a further tube slidably disposed in the top end of said dispensing tube and operable upon outward extension therefrom to uncover the vent opening in said dispensing tube; and (d) means extending intermediate the inside of said fluid dispensing and measuring member and the top interior of said container for determining the level to which fluid in the container will rise inside of said fluid dispensing and measuring member.

5. The apparatus of claim 4 in which the measuring chamber is formed in the shape of an inverted cone.

6. The apparatus of claim 5 in which the top end of the dispensing tube is provided with an indicia to be used in orienting the container when dispensing fluid therefrom.

References Cited by the Examiner

UNITED STATES PATENTS

| 2,704,623 | 3/1955 | Yasso | 222—456 |
| 2,747,776 | 5/1956 | Hentschke et al. | 222—456 |

FOREIGN PATENTS

| 1,020,562 | 12/1957 | Germany. |
| 4,936 | 2/1913 | Great Britain. |

M. HENSON WOOD, JR., *Primary Examiner.*

LOUIS J. DEMBO, *Examiner.*

A. N. KNOWLES, *Assistant Examiner.*